United States Patent
Walia et al.

(10) Patent No.: US 8,326,973 B2
(45) Date of Patent: Dec. 4, 2012

(54) TECHNIQUES FOR GAUGING PERFORMANCE OF SERVICES

(75) Inventors: Harpreet Singh Walia, Bangalore (IN); Arijit Dutta, Bopodi (IN)

(73) Assignee: Novell, Inc., Provo, UT (US)

( * ) Notice: Subject to any disclaimer, the term of this patent is extended or adjusted under 35 U.S.C. 154(b) by 587 days.

(21) Appl. No.: 12/342,289

(22) Filed: Dec. 23, 2008

(65) Prior Publication Data

US 2010/0161789 A1 Jun. 24, 2010

(51) Int. Cl.
*G06F 15/173* (2006.01)
(52) U.S. Cl. ...................................................... 709/224
(58) Field of Classification Search .......... 709/223–226; 370/252, 389, 238
See application file for complete search history.

(56) References Cited

U.S. PATENT DOCUMENTS

| | | | |
|---|---|---|---|
| 6,910,061 B2 | 6/2005 | Hu | |
| 7,159,026 B2 | 1/2007 | Lau et al. | |
| 7,353,265 B2 | 4/2008 | Gopalkrishnan et al. | |
| 7,401,143 B2 | 7/2008 | Oulu et al. | |
| 7,437,460 B2 * | 10/2008 | Chidambaran et al. | 709/226 |
| 7,661,106 B1 * | 2/2010 | Ankireddipally et al. | 718/101 |
| 2002/0184575 A1 * | 12/2002 | Landan | 714/47 |
| 2002/0198984 A1 * | 12/2002 | Goldstein et al. | 709/224 |
| 2003/0061256 A1 * | 3/2003 | Mathews et al. | 709/101 |
| 2007/0282966 A1 * | 12/2007 | Walker | 709/213 |
| 2007/0283009 A1 | 12/2007 | Takemura | |
| 2008/0104230 A1 | 5/2008 | Nasuto et al. | |

* cited by examiner

*Primary Examiner* — Joseph E. Avellino
*Assistant Examiner* — Mark O Afolabi
(74) *Attorney, Agent, or Firm* — Schwegman, Lundberg & Woessner, P.A.

(57) ABSTRACT

Techniques for gauging performance of services are provided. A client agent is configured to process on a client. The client agent simulates operations of a transaction as instructed by a server agent. The client agent also gathers metrics for each of the operations as they process on the client and passes the metrics back to the server agent. The server agent analyzes the metrics in accordance with a policy and takes one or more actions in response thereto.

21 Claims, 3 Drawing Sheets

TECHNIQUES FOR GAUGING PERFORMANCE OF SERVICES

BACKGROUND

During the regular course of using electronic and networked assets of an enterprise, a user may often experience a wide spectrum of satisfaction with using those assets.

The need to gauge end-user experiences in a distributed, service-oriented environment is very important. Companies like banks and retail chains have a challenge to coordinate availability and performance of systems and information across multiple branch sites and remote locations. There is a need to identify these problems and pinpoint issues proactively.

Most enterprises have mechanisms to determine response times of interactions with users between the users and the sites of the enterprises. However, the ability to gather metrics below the site level to the individual services and even operations within services is grossly lacking.

As a result, true problems that may exist can go undetected for quite some time. This means the enterprise could potentially lose many customers before the situation is properly remedied. These lost customers may never return to the enterprise.

Consequently, it is readily apparent that the ability to efficiently, accurately, and timely gauge performance below the site level of an enterprise is of vital importance to an enterprise.

Moreover, it is not just the potential of losing customers that is important to an enterprise. For example, pricing levels with customers can be based on performance metrics associated with pre-established Service-Level Agreements (SLA's) or End-User Performance (EUP) metrics. So, an enterprise may not be getting the income it rightfully deserves and may not have any valid mechanism for determining what a fair and proper pricing-level should be with a customer because the metrics are unreliable and in many cases unattainable with existing approaches.

Thus, improved techniques for measuring the performance of enterprise services are needed.

SUMMARY

In various embodiments, techniques for gauging performance of enterprise services are provided. More specifically, and in an embodiment, a method is provided for gauging performance of a service. An agent is configured to simulate operations of a transaction on a client of a network. The agent is installed on the client over a network. Next, the agent is instructed over the network to initiate the transaction processing on the client. Finally, metrics are received over the network from the agent associated with processing the transaction on the client; the metrics are for each operation taken when processing the transaction.

DETAILED DESCRIPTION

Figure 1:
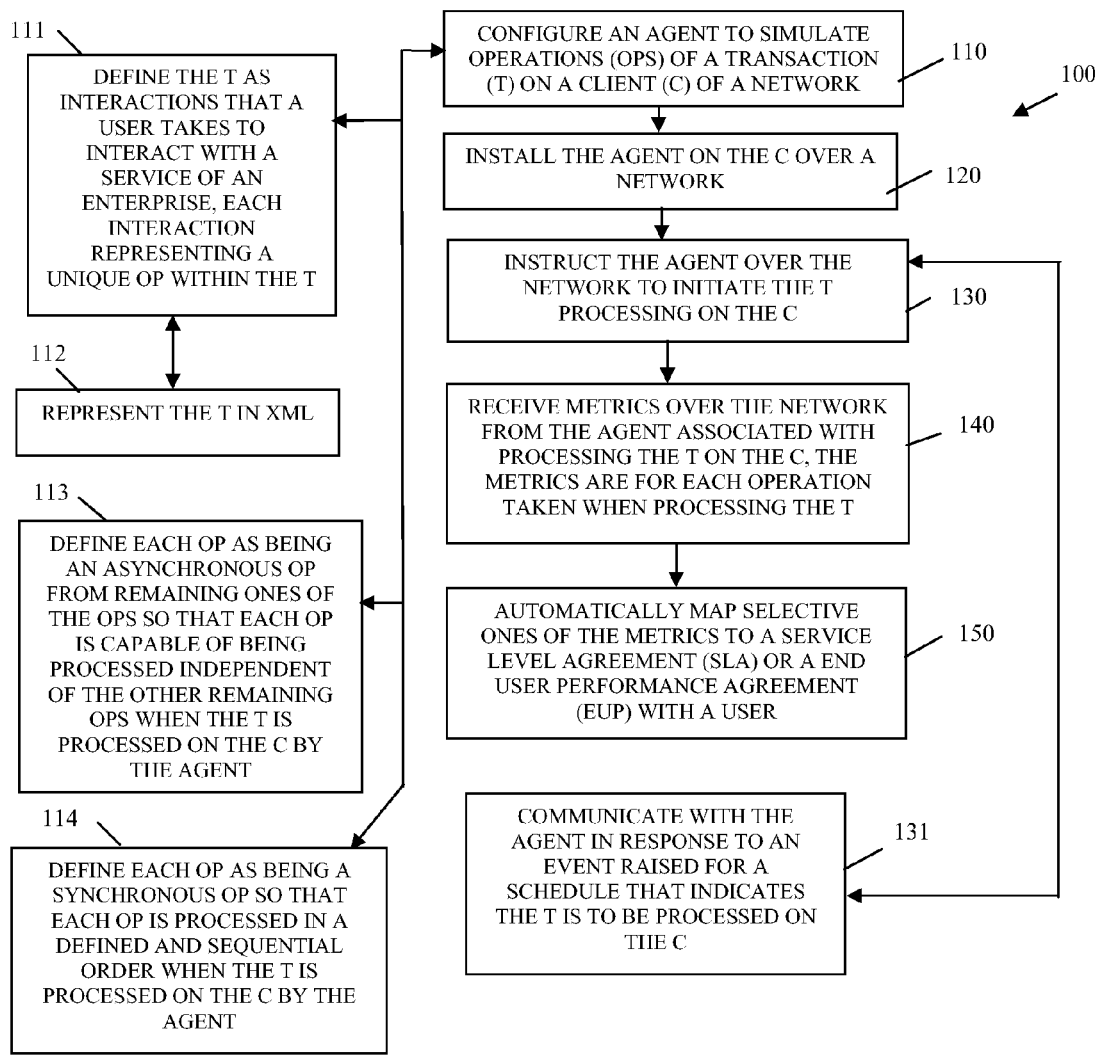
FIG. 1 is a diagram of a method for gauging performance of a service, according to an example embodiment.

A "resource" includes a user, content, a processing device, a node, a service, an application, a system, a directory, a data store, groups of users, combinations of these things, etc. Resources can interact with each other and can either act on other resource or be acted upon by other resources. The term "service," "agent," and "application" may be used interchangeably herein and refer to a type of software resource that includes instructions, which when executed by a machine (processor or processor-enabled device) performs operations that change the state of the machine and that may produce output.

A "principal" is a special type of resource that includes its own unique identity within a processing context or environment. An example principal includes a user or an automated service/application.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) or a wide-area network (WAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

A "transaction" as used herein is a set of processing actions, steps, or operations that a principal (e.g., user) takes when interacting with a service over a network connection, such as an Internet connection.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for gauging performance of a service, according to an example embodiment. The method 100 (hereinafter "simulation service") is implemented as instructions in a machine-accessible and computer-readable storage medium. The instructions when executed by a machine (computer, processor, or processor-enabled device) perform the processing depicted in FIG. 1. The simulation service is also operational over and processes within a network. The network may be wired, wireless, or a combination of wired and wireless.

At 110, the simulation service configures an agent to simulate operations of a transaction on a client (network processing device—in a client-server architecture) over a network connection, such as but not limited to an Internet connection.

In an embodiment, at 111, the simulation service defines the transaction as a set of principal interactions that can be taken during a given session by the principal (e.g., user) with a service (e.g., automated enterprise network resource) over the network. Each interaction representing a unique operation or processing step taken by the principal during the session.

Continuing with the embodiment of 111 and at 112, the simulation service represents the transaction in an extendible markup language (XML) format. Of course any custom or desired format for the transaction can be used without departing from the beneficial teachings presented herein.

According to an embodiment, at 113, the simulation service defines each operation as being an asynchronous operation from the remaining operations. So, each operation is capable of being processed independent of the other remaining operations when the transaction is eventually processed on the client by the agent.

In an alternative approach, at 114, the simulation service defines each operation as being a synchronous operation, such that each operation is processed in a defined and sequential order when the transaction is processed on the client by the agent.

So, the operations of the transaction can have no order with which they must be process (asynchronous) or they can have a predefined sequential order (synchronous).

In fact in some cases the operations within the transaction may be both synchronous and asynchronous. That is, some operations within the transaction may be logically grouped as synchronous whereas other operations are identified as asynchronous. So, a combination can exist as well.

As an example transaction consider a user or even an automated application (another type of principal) that performs a query transaction against an enterprise's database. The transaction may be defined as having 4 unique operations or steps: 1) establish a connection to the database; 2) execute the query; 3) get a response from the database; and 4) return the results and close the database connection. Another example might be a user buying milk from an online store defined as 6 operations or steps: 1) login to the enterprise application service; 2) choose a type of milk desired by the user; 3) add the milk desired to the online shopping cart and select a desired quantity; 4) check out; 5) provide purchasing information and credit card information to the application service; and 6) conclude the transaction and logoff. Conventional approaches would measure metrics if at all for the above transaction at the coarse-grain level of the transaction itself and would not be capable of obtaining metrics at the operations level for the transaction. In other words, the teachings presented herein and below permit intra-transactional metrics to be obtained at the transaction's operation level.

At 120, the simulation service dynamically installs the agent on the client over the network. That is, the simulation service pushes the configured agent to the client for immediate installation on the client machine. The simulation service processes on a server machine over the network and the client and server are implemented in a client-server architecture.

At 130, the simulation service instructs the agent over the network to initiate the transaction to process on the client. That is, the agent waits for instructions from the simulation service to initiate the transaction.

It is noted that once the agent is configured to process the transaction on the client; the simulation service can subsequently send other and different transactions to the client for processing. So, the agent is configured to handle a variety of different transactions by the simulation service. Policies having dynamically enforceable conditions may be evaluated by the agent at run time to properly process any given transaction and report back specific desired information to the simulation service.

According to an embodiment, at 131, the simulation service communicates with the agent in response to an event raised for a schedule that indicates the transaction is to be processed on the client. In other words, a scheduling event is detected by the simulation service that instructs the simulation service to contact the agent and have the agent process the transaction. For example, the scheduling event might be every night at 2:00 a.m. the simulation service contacts the agent to run the transaction. It may also be the case that a particular dynamically detected event causes the simulation service to have the transaction processed by the agent. For example, if a report of network slowness is received an event is raised and this event is detected by the simulation service causing the simulation service to initiate the transaction processing on the client by the agent.

At 140, the simulation service receives metrics over the network from the agent. The metrics are associated with processing the transaction on the client. The metrics are for each operation taken when the transaction is processed. Some of the metrics may also be for the transaction as a whole.

A set of example end-user performance (EUP) metrics can include dynamic availability that gauges if defined availability criteria are met or not, which is driven by policy. The policy is defined such that it identifies conditions indicating that 1) all steps should pass; and/or 2) some steps if failed do not affect availability (e.g., logout) of the service being measured.

The metrics gathered are related to performance and can be collected from a variety of network nodes (e.g. devices, resources, etc.). Some example metrics include: 1) response time from various network locations; 2) lag time when remote interactions are needed, such that total response time—local response time=lag time; and/or 3) response time criteria—criteria for response times, such as excessive time (above a threshold) for processing credit card information by a service.

According to an embodiment, at 150, the simulation service automatically maps selective ones of the metrics to a service-level agreement (SLA) or EUP agreement with a particular user. So, an SLA defines an agreement in terms of performance and availability of a service and the simulation service can map this to a time metric for breached conditions or calculations. The same set of metrics can now be used to identify service breaches at a discrete step within (operation) level of the transaction by comparing it to a threshold value defined in a policy.

This is a unique approach when evaluated in view of current techniques that monitor SLA's because current techniques manage SLA's at the transaction level. With the techniques presented herein, critical path or bottlenecks at the sub transaction level can be identified for successfully managing performance of a service's transaction processing for any given synthetic or simulated transaction.

Figure 2:
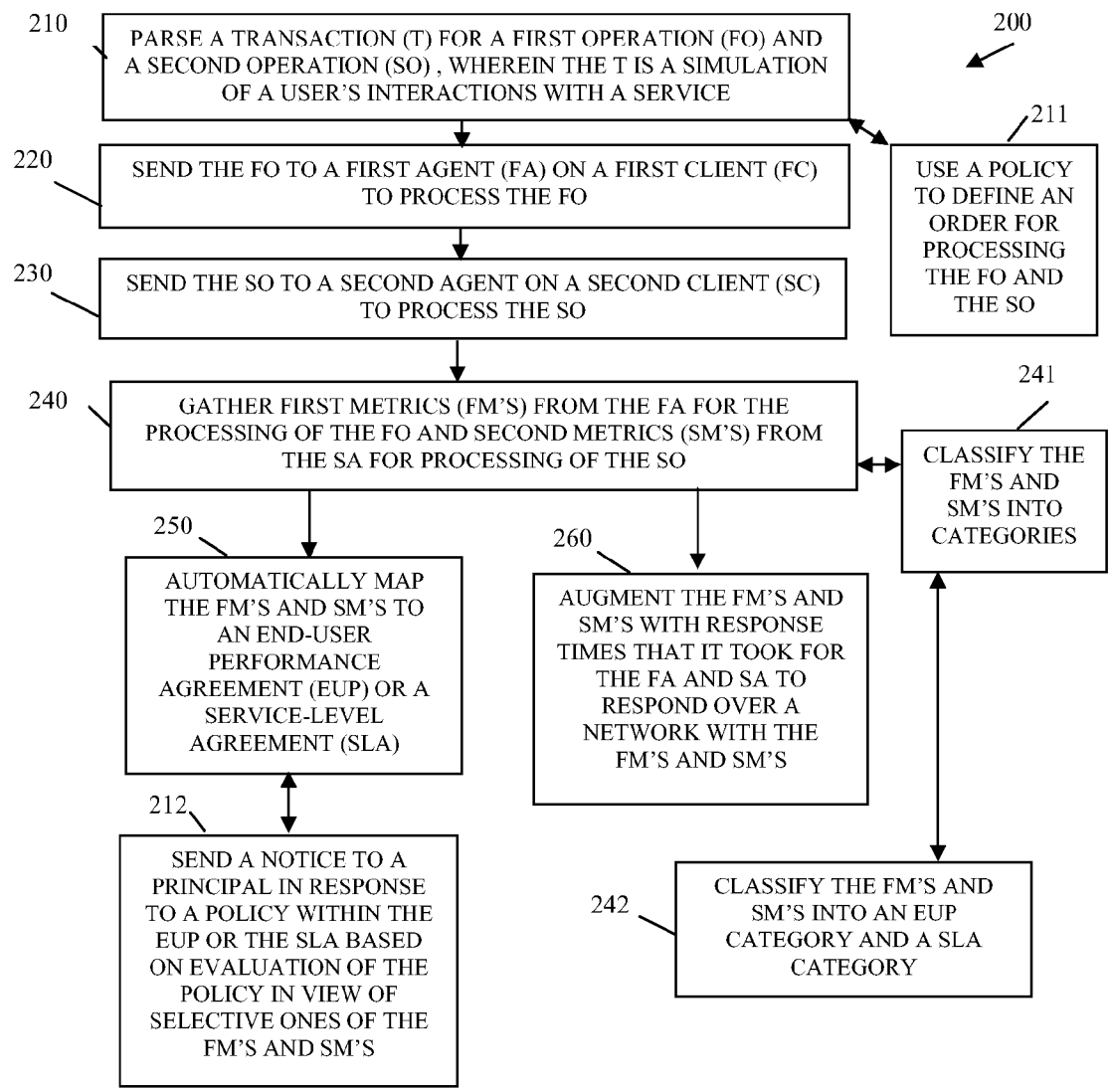
FIG. 2 is a diagram of another method for gauging performance of a service, according to an example embodiment.

FIG. 2 is a diagram of another method 200 for gauging performance of a service, according to an example embodiment. The method 200 (hereinafter "performance gauging service" is implemented in a machine-accessible and computer-readable storage medium as instructions. The instructions when executed by a machine (processor) perform the processing depicted in the FIG. 2. Moreover, the performance gauging service is operational over a network, and the network may be wired, wireless, or a combination of wired and wireless.

The performance gauging service presents another in some cases enhanced perspective to the simulation service represented by the method 100 of the FIG. 1.

At 210, the performance gauging service parses a transaction for a first operation and a second operation of the transaction. The transaction is a simulation of a user's interaction with a service. The transaction is synthetically produced for simulation on a client to gauge the performance of the service as it would occur when interacting with any given user.

According to an embodiment, at 211, the performance gauging service uses a policy to define an order for processing the first operation and the second operation. So, the policy includes conditions that when dynamically evaluated by the performance gauging service instructs the performance gauging service on whether each operation is asynchronous (having no order) or synchronous (having a predefined order). The operations may be both asynchronous, both synchronous, or a combination of both asynchronous and synchronous.

At 220, the performance gauging service sends the first operation to a first agent on a first client to process the first operation.

At 230, the performance gauging service sends the second operation to a second on a second client to process the second operation.

So, the simulation service represented by the method 100 of the FIG. 1 demonstrates how multiple operations of a single transaction are processed by a single network client. Conversely, the performance gauging service demonstrates how multiple operations of a single transaction are processed by two different network clients and two different network agents (first and second agents).

At 240, the performance gauging service gathers first metrics from the first agent, which is associated with processing the first operation on the first client. Moreover, the performance gauging service gathers second metrics from the second client, which is associated with processing the second operation on the second client.

In an embodiment, at 241, the performance gauging service classifies the first metrics and the second metrics into categories. In some situations, at 242, the performance gauging service classifies the first metrics and the second metrics into an EUP category and a SLA category.

In one situation, at 250, the performance gauging service automatically maps the first metrics and the second metrics to an EUP agreement or a SLA. This was discussed above with reference to the method 100 of the FIG. 1.

Continuing with the embodiment at 250 and at 251, the performance gauging service sends a notice to a principal in response to a policy within the EUP agreement of the SLA based on an evaluation of the policy conditions in view of selective ones of the first and second metrics. For example if a SLA condition is breached an email can be sent to a project manager informing the project manager of the breached condition.

In still another case, at 260, the performance gauging service augments the first metrics and the second metrics with response times that it took for the first agent and the second agent to respond over the network with the first metrics and the second metrics. So, global metrics can be independently gathered about the agents by the performance gauging service.

The metrics are used to analyze policy conditions and agreements. So, if some metrics values exceed values of agreements by predefined thresholds then actions can be taken in an automated and dynamic manner. In other cases, the accumulation of the metrics over time can be mined to discover patterns or problem areas within a given service.

Figure 3:
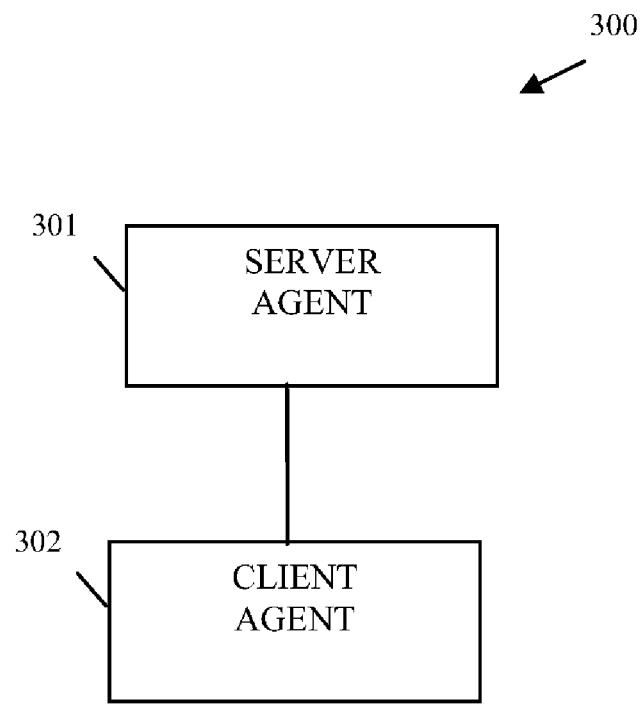
FIG. 3 is a diagram of a service performance gauging system, according to an example embodiment.

FIG. 3 is a diagram of a service performance gauging system 300, according to an example embodiment. The service performance gauging system 300 is implemented in a machine-accessible and computer-readable storage medium as instructions. The instructions when executed by one or more machines (computers, processors, or processor-enabled devices) perform the processing depicted in the FIGS. 1 and 2. Moreover, the service performance gauging system 300 is operational over a network, and the network may be wired, wireless, or a combination of wired and wireless.

The service performance gauging system 300 includes a server agent 301 and a client agent 302. Each of these and their interactions with one another will now be discussed in turn.

The server agent 301 is implemented in a computer-readable storage medium as instructions that process on a server machine of the network. Example processing associated with the server agent 302 was described in detail above with reference to the methods 100 and 200 of the FIGS. 1 and 2, respectively.

The server agent 301 agent configures the client agent 302 to process on a client and to receive a transaction. The transaction simulations multiple operations for a service and to gather metrics during processing of the operations on the client. The client agent 302 also reports the metrics back to the server agent 301.

In an embodiment, the server agent 301 analyzes the metrics returned in accordance with defined policy conditions of an enterprise.

In some cases, in response to analyzing the metrics the server agent 301 maps the returned metrics to an EUP agreement or SLA.

In still more cases, the server agent 301 in response to the mapping compares the metrics to elements in the EUP agreement or SLA in view of predefined threshold values and in response thereto takes one or more automated actions, such as automatic notification to an administrator or project manager, etc.

According to an embodiment, the server agent 301 initiates the transaction in response to a detected scheduling event, which may itself be driven by enterprise policy definitions.

The client agent 302 is implemented in a computer-readable storage medium as instructions that process on a client of the network. Example aspects of the client agent 302 were presented above with reference to the methods 100 and 200 of the FIGS. 1 and 2, respectively.

The client agent 302 interfaces with the server agent 301 and processes the operations of the transaction and gathers and reports the metrics back to the server agent 301 for subsequent assimilation.

Figure 4:
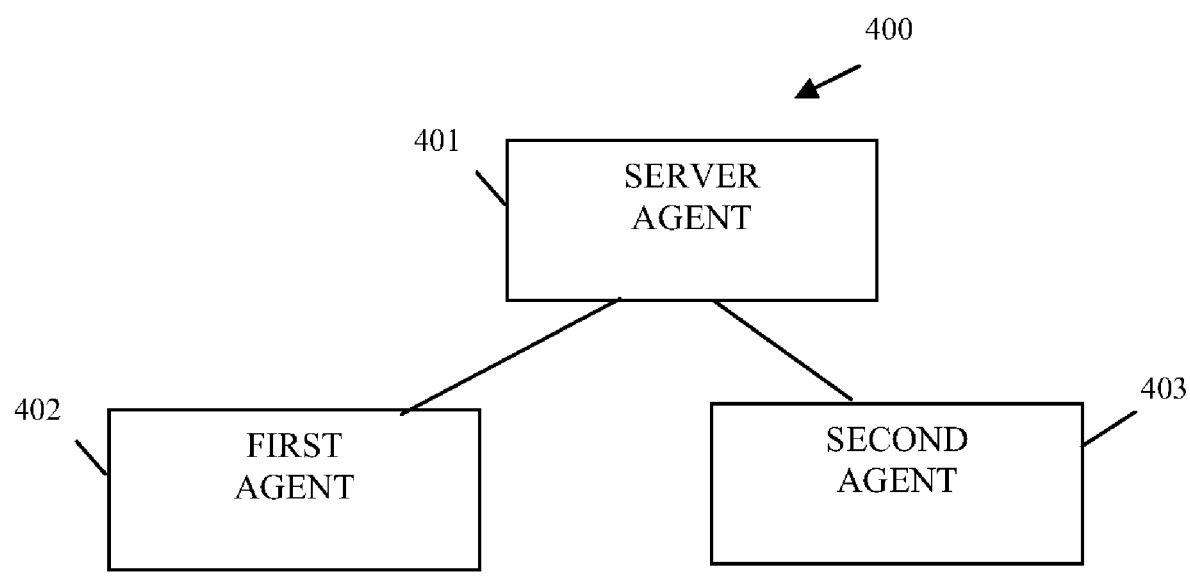
FIG. 4 is a diagram of another service performance gauging system according to an example embodiment.

FIG. 4 is a diagram of another service performance gauging system 400 according to an example embodiment. The service performance gauging system 400 is implemented as instructions on or within a machine-accessible and computer-readable storage medium. The instructions when executed by one or more machines (computer(s), processor(s), or processor-enabled device(s)) perform various aspects of the processing depicted with respect to the methods 100 and 200 of the FIGS. 1 and 2, respectively; and the system 300 of the FIG. 3. The service performance gauging system 400 is also operational over a network and the network may be wired, wireless, or a combination of wired and wireless.

The service performance gauging system 400 includes a server agent 401, a first client agent 402, and a second client agent 403. Each of these components and their interactions with one another will now be discussed in turn.

The server agent 401 is implemented in a computer-readable storage medium as instructions and is to be processed by a server over a client-server architecture network. Example aspects of the server agent 401 were presented above in detail with reference to the methods 100 and 200 of the FIGS. 1 and 2, respectively, and with respect to the system 300 of the FIG. 3.

The server agent 401 server agent parses a transaction, which simulates interactions of a user with a service over the network, for a first operation and a second operation. The server agent 401 also passes the first operation to the first client agent 402 for processing on the first client and passes the second operation to the second client agent 403 for processing on the second client. The first 402 and second 403 agents send metrics back to the server agent 401 that are associated with the processing of the first and second operations.

In an embodiment, the server agent 401 augments the metrics with response times associated with a delay that it takes for the first 402 and second 403 agents to complete processing the first and second operations.

In another case, the server agent 401 schedules when to pass the first and second operations to the first 402 and second 403 agents in response to a scheduling event.

In yet another situation, the server agent 401 agent asynchronously passes the first and second operations to the first 402 and second 403 agents.

Alternatively or perhaps in connection with the asynchronous circumstance, the server agent 401 synchronously passes the first operation to the first 402 agent before the server agent 401 passes the second operation to the second agent 403.

The first client agent 402 is implemented as instructions in a computer-readable storage medium and processed on a first client of the network. Example aspects of the first client agent 402 were described in detail above with reference to the FIGS. 1-3.

The second client agent 403 is implemented as instructions in a computer-readable storage medium and processed on a first client of the network. Example aspects of the first client agent 403 were described in detail above with reference to the FIG. 2.

The first 402 and second 403 agents are configured and dynamically installed by the server agent 401. The server agent 401 also sends a whole transaction including multiple operations to one of the agents (402 or 403) or sends pieces of a single transaction (first and second operations as defined above) to each of the agents (402 or 403) separately. The agents (402 and 403) process the operations and gather metrics that are reported back to the server agent 401. The types of metrics and amount of information can be defined by policy that is configured with the agents (402 or 403) or sent to the agents with each operation or transaction that the agents (402 or 403) are asked to process on behalf of the server agent 401.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory computer-readable storage medium that executes on a processor to perform the method, comprising:
    configuring, by the processor, an agent to simulate operations of a transaction on a client of a network and configuring the agent for evaluating dynamically enforceable conditions defined in policies at run time of the agent on the client for reporting back specific information provided for in the policies;
    installing, by the processor, the agent on the client over a network;
    instructing, by the processor, the agent over the network to initiate the transaction processing on the client; and
    receiving, by the processor, metrics over the network from the agent associated with processing the transaction on the client, the agent processes the transaction a combination of asynchronous operations and synchronous operations, wherein the metrics are for each operation taken when processing the transaction, the metrics are received as intra-transactional metrics obtained for each operation of the transaction and some metrics are also received for the transaction as a whole and the metrics are received for the transaction and each network node that is used during the transaction.

2. The method of claim 1, wherein configuring further includes defining the transaction as interactions that a user takes to interact with a service of an enterprise, each interaction representing a unique operation within the transaction.

3. The method of claim 2, wherein defining further includes representing the transaction in extensible markup language (XML).

4. The method of claim 1, wherein instructing further includes communicating with the agent in response to an event raised for a schedule that indicates the transaction is to be processed on the client.

5. The method of claim 1 further comprising, automatically mapping, by the processor, selective ones of the metrics to a service level agreement or an end user performance agreement with a user.

6. A method implemented in a non-transitory computer-readable storage medium that executes on a processor to perform the method, comprising:
    parsing, by the processor, a transaction for a first operation and a second operation, wherein the transaction is a simulation of a user's interactions with a service and the transaction includes the first operation and the second operation, the first operation is asynchronous with other operations and the second operation is synchronous with specific ones of the other operations;

sending, by the processor, the first operation to a first agent on a first client to process the first operation;

sending, by the processor, the second operation to a second agent on a second client to process the second operation;

sending, by the processor, specific policies to the first and second agents, the first and second agents evaluate dynamic enforceable conditions defined in the specific policies at run time of the first and second agents and report back specific information provided for in the specific policies;

gathering, by the processor, first metrics from the first agent for the processing of the first operation and second metrics from the second agent for processing of the second operation; and mining, by the processor, other metrics accumulated over time with the first metrics and the second metrics to discover patterns or problem areas for the service.

7. The method of claim 6 further comprising, automatically mapping, by the processor, the first and second metrics to an end-user performance agreement or a service-level agreement.

8. The method of claim 7 further comprising, sending, by the processor, a notice to a principal in response to a policy within the end-user performance agreement or the service-level agreement based on evaluation of the policy in view of selective ones of the first and second metrics.

9. The method of claim 6 further comprising, augmenting, by the processor, the first and second metrics with response times that it took for the first and second agents to respond over a network with the first and second metrics.

10. The method of claim 6, wherein gathering further includes classifying the first and second metrics into categories.

11. The method of claim 10, wherein classifying further includes classifying the first and second metrics into an end-user performance category and a service-level agreement category.

12. A processor-implemented system to execute on two or more processors of a network, comprising:
a server of a network having memory and one or more processors the memory configured with a server agent implemented in a non-transitory computer-readable storage medium that processes on the server of the network; and
a client of the network having memory and one or more processors the memory configured with a client agent implemented in a non-transitory computer-readable storage medium that processes on the client of the network;
wherein the server agent configures the client agent to process on the client and to receive a transaction that simulates multiple operations for a service and to gather metrics during processing of the operations on the client and to further report the metrics back to the server agent, the server agent configures the client agent to also evaluate dynamically enforceable specific policies at run time of the client agent for reporting back specific information defined in the specific policies, the multiple operations represent the transaction with the service and the gathered metrics are for each operation of the transaction and some of the gathered metrics for the transaction as a whole and also for nodes that are used by the service in processing the transaction, and the multiple operations include some that are asynchronous and others of the multiple operations that are synchronous.

13. The system of claim 12, wherein the server agent analyzes the metrics in accordance with conditions defined in a policy.

14. The system of claim 13, wherein the server agent in response to evaluating the conditions defined in the policy maps the metrics to an end-user agreement or a service-level agreement.

15. The system of claim 14, wherein the server agent compares the metrics to elements in the end-user agreement or the service-level agreement and in response to thresholds values used for the comparison takes one or more actions defined in another policy.

16. The system of claim 15, wherein the server agent notifies an administrator in taking one of the actions.

17. The method of claim 12, wherein the server agent initiates the transaction in response to a scheduling event.

18. A processor-implemented system to execute on two or more processors of a network, comprising:
a server of a network having memory and one or more processors, the memory configured with a server agent implemented in a non-transitory computer-readable storage medium that processes on the server of the network; and
a first client of the network having memory and one or more processors, the memory configured with a first client agent implemented in a non-transitory computer-readable storage medium that processes on the first client of the network;
a second client of the network having memory and one or more processors, the memory configured with a second client agent implemented in a non-transitory computer-readable storage medium that processes on the second client of the network;
wherein the server agent parses a transaction, which simulates interactions of a user with a service over the network, for a first operation and a second operation and passes the first operation to the first client agent for processing on the first client and passes the second operation to the second client agent for processing on the second client, and wherein the first and second agents send metrics back to the server agent associated with the processing of the first and second operations, the first and second client agents configured to evaluate dynamically enforceable conditions defined in specific policies at run time and report back to the server agent specific information defined in the specific policies, and the server agent is configured to use other metrics accumulated over time with the metrics to discover patterns or problem areas for the service, the first operation is asynchronous and the second operation is synchronous and dependent on an order for processing other operations.

19. The system of claim 18, wherein the server agent augments the metrics with response times associated with a delay that it takes for the first and second agents to complete processing the first and second operations.

20. The system of claim 18, wherein the server agent schedules when to pass the first and second operations to the first and second agents in response to a scheduling event.

21. The system of claim 18, wherein the server agent asynchronously passes the first and second operations to the first and second agents.

* * * * *